United States Patent [19]
Cornell et al.

[11] 3,932,021
[45] Jan. 13, 1976

[54] TENSION ENERGIZED CABLE CLAMP

[75] Inventors: Paul V. Cornell, Amherst, Mass.;
Robert E. Lawlor, Huntington Beach, Calif.

[73] Assignee: Electro Clamp Corporation, Beverly Hills, Calif.

[22] Filed: Apr. 10, 1974

[21] Appl. No.: 459,578

[52] U.S. Cl. .... 339/266 R; 24/132 WL; 24/249 WL
[51] Int. Cl.² ........................................... H01R 7/08
[58] Field of Search......... 339/266 R, 273 R, 273 F, 339/273 S; 24/132 WL, 132 AB, 132 AC, 132 AA, 132 WF, 249 WL, 249 PP

[56] References Cited
UNITED STATES PATENTS

| | | | |
|---|---|---|---|
| 3,118,720 | 1/1964 | Smuck et al. | 339/266 R |
| 3,169,818 | 2/1965 | Tracy | 339/266 R |
| 3,351,889 | 11/1967 | Lawlor et al. | 339/266 R |
| 3,406,372 | 10/1968 | Lawlor | 339/266 R |
| 3,801,952 | 4/1974 | Lawlor | 339/266 R |
| 3,831,134 | 8/1974 | Cornell et al. | 339/266 R |

FOREIGN PATENTS OR APPLICATIONS

| | | | |
|---|---|---|---|
| 24,533 | 11/1908 | United Kingdom | 339/266 R |

*Primary Examiner*—Paul R. Gilliam
*Attorney, Agent, or Firm*—Hume, Clement, Brinks, Willian, Olds & Cook, Ltd.

[57] ABSTRACT

A cable clamp having jaws hingedly connected at one end by a hinge having a diametrical bore through which a cable can be inserted between the jaws, is energized by tension applied to the other ends of the jaws by a means acting to draw the jaws together into clamping engagement with a cable engaged between the jaws.

9 Claims, 12 Drawing Figures

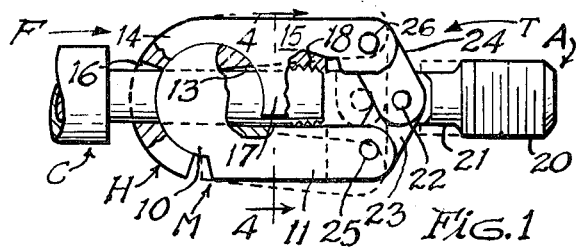
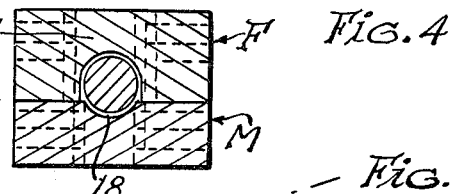
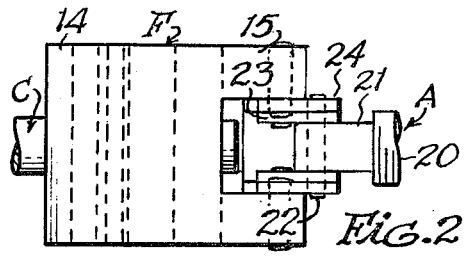
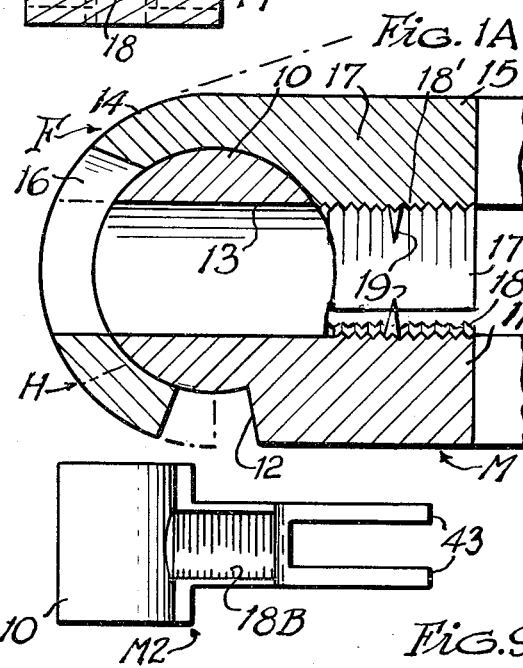
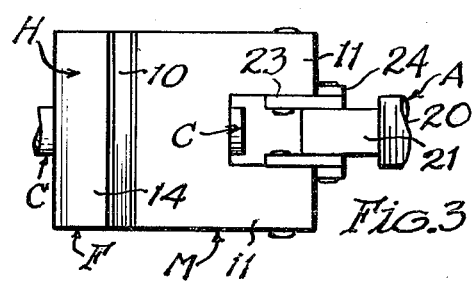
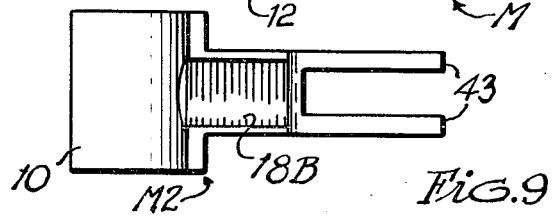
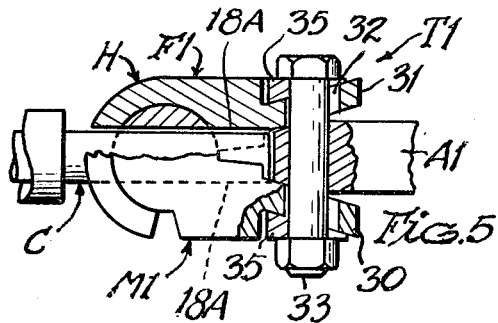
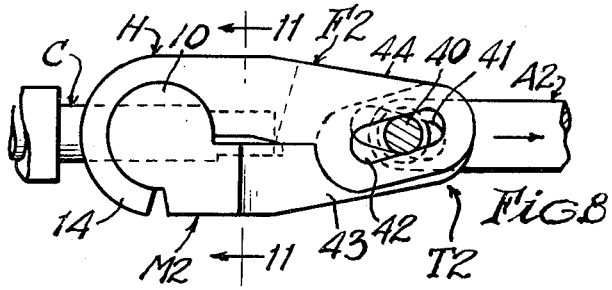
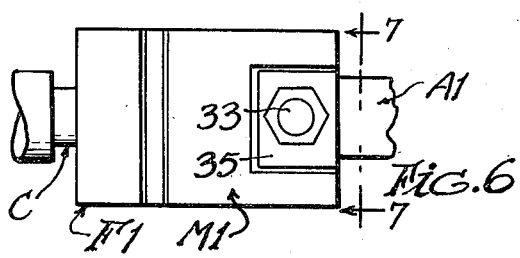
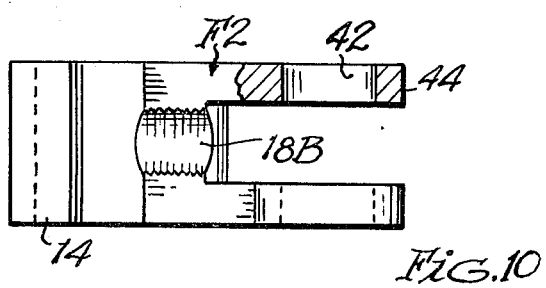
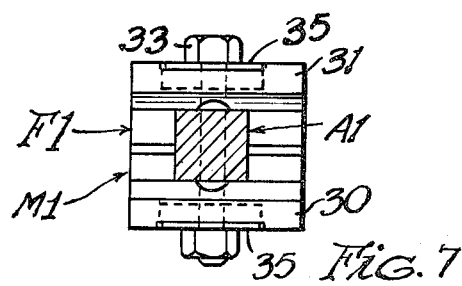
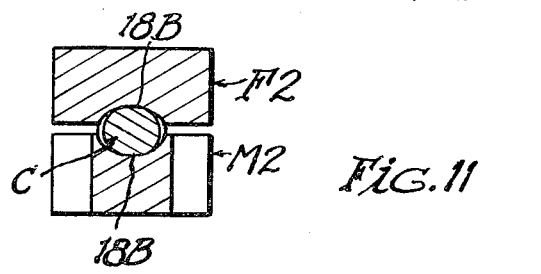

TENSION ENERGIZED CABLE CLAMP

BACKGROUND OF THE INVENTION

Cable clamps having jaws hingedly connected for movement between an open, cable-receiving position and a closed, cable-clamping position, are known in the art and are exemplified by the following patents:

Schuck et al.—U.S. Pat. No. 3,118,720—Electrical Connector

Lawlor.—U.S. Pat. No. 3,138,422—Electrical Connector with Wire-Gripping Means

Lawlor et al.—U.S. Pat. No. 3,351,889—Connector with Wire-Gripping Means

Lawlor—U.S. Pat. No. 3,406,372—Non-Shearing Electrical Connector

Beaudion—U.S. Pat. No. 3,437,979—Connector with Wire-Gripping Means

Lawlor—U.S. Pat. No. 3,477,060—Connector of Sheet-Metal Construction

Tracy—U.S. Pat. No. 3,169,818-Electrical Conductor Clamp

Peterson—U.S. Pat. No. 2,700,807-Guy Wire Clamp

Goetzelman—U.S. Pat. No. 1,955,283-Ground Connection

Lanfear—U.S. Pat. No. 2,680,145-Wire Connector

German Pat. No. 698,501

The devices of the foregoing patents and of any other prior art within our knowledge (clamps such as disclosed in the above-listed Schuck et al. patent) rely upon fastener bolts inserted through integral tails or base members of respective jaws, or on frictional engagement of rotatable connections between jaws, in order to maintain clamping engagement of the jaws against a cable.

SUMMARY OF THE INVENTION

The present invention improves upon such prior clamps by developing clamping action through tension acting against respective ends of the clamp, the tension at one end being applied through means such as toggle links or camming devices acting to draw the members of said one end together in a manner to effect gripping action of the jaws in proportion to the tension applied. Initial gripping action sufficient to develop the tension-energized gripping action, may be provided for by cable-engaging teeth on the respective jaws.

BRIEF DESCRIPTION OF THE DRAWINGS

Objects of the invention will become apparent in the following specification and appended drawing, in which:

FIG. 1 is a side elevational view of a cable clamp embodying one form of the invention;

FIG. 2 is a plan view of the same;

FIG. 3 is an inverted plan view thereof;

FIG. 4 is an end view thereof, partially in section as indicated by line 4—4 of FIG. 1;

FIG. 5 is a side elevational view of a modified form of the invention, partially in section;

FIG. 6 is a plan view of the same;

FIG. 7 is an end view thereof, partially in section as indicated by line 7—7 of FIG. 6;

FIG. 8 is a side elevational view of another modified form of the invention, partially in section;

FIG. 9 is an inverted plan view of one of the jaw members of FIG. 8;

FIG. 10 is a plan view of the other jaw member thereof;

FIG. 11 is an end sectional view thereof on line 11—11 of FIG. 8; and

FIG. 1A is an enlarged detail section of FIG. 1. DETAILED DESCRIPTION OF THE INVENTION Referring now to the drawing in detail, and particularly to FIGS. 1–4 and 1A thereof, I have shown as one embodiment, a cable clamp comprising male and female jaw members M and F respectively; hinged together by a hinge H, adapted to clampingly engage a cable end C, and having an anchor part A connected to the jaws by means of a toggle linkage T which is operable to apply closing, clamping pressure to the jaws in response to tension developed between cable C and anchor part A.

Male jaw M comprises a cylindrical trunnion 10 and a bifurcated arm or yoke 11 extending from an offset neck 12 joining the yoke to the trunnion, the latter being disposed at one side of the yoke (the upper side as viewed in FIG. 1). Trunnion 10 has a diametrical bore 13 through which cable C may be passed.

Female jaw F comprises a cylindrical socket 14 in which trunnion 10 is rotatably fitted for hinging movement of the jaws; a bifurcated arm or yoke 15 extending tangentially from socket 14 in spaced opposition to yoke 11; and a bore 16 adapted to be aligned with bore 13 of the male jaw when the clamp is in open position (indicated in broken lines in FIG. 1) whereby the cable C may be easily inserted through the bore 16 (a circumferentially elongated opening) and the bore 13. Socket 14 is of substantially more than 180° circumferential extent and includes a jaw portion 17 of yoke form transversely, having a U-shaped internal cable-clamping surface 18 of cable-gripping character (e.g. circumferentially serrated as at 18' in FIG. 1A) disposed substantially as an extension of bore 16 and in opposed relation to a similar clamping surface 18 of jaw M.

Preliminary cable gripping, pending application of full cable tension, is provided for by serrations 18' and/or by opposed teeth 19 on the respective jaws, projecting from jaw surfaces 18.

Anchor fitting A includes a threaded shank 20 or equivalent means for attachment to an anchoring body or cable; and a neck 21 in which is fixed a connecting pin 22 of linkage T. Toggle linkage T comprises two pairs of toggle links, 23 and 24, both linked to the pin 22 at converging inner ends. The outer ends of links 23 are pivotally linked to male yoke 11 by pintles 25, and the outer ends of links 24 are pivotally linked to female jaw yoke 15 by pintles 26. The links 23 and 24 converge toward fitting A so that when tension is applied between cable C and fitting A (cable C being meanwhile lightly gripped by teeth 19 to prevent disengagement of the cable from between the jaws) the grip of the jaws will be intensified by the action of the linkage T in drawing the yokes 11 and 15 together.

Referring now to FIGS. 5–7, the modified clamp shown therein comprises jaw M1 and F1 connected by a hinge H of the same construction as in FIGS. 1–4; a pair of integral tangentially projecting arms 30 and 31 of outwardly flaring relation, diverging toward their free ends and having elongated medial slots 32; and a bolt 33 extending through the slots 32 and anchored in an anchor bar or the like A1 for connecting clamp to an anchoring body. Washers 35 of wedge form on the outer ends of bolt 33, are engaged against ramp surfaces on the remote sides of arms 30, 31, and cooperate therewith to apply clamping pressure to jaws F1 and M1 by wedging action against such ramp surfaces when tension is applied through bolt 33 from anchor bar A1. Clamping pressure is applied by jaw surfaces 18A of jaws M1, F1.

In the further modification shown in FIGS. 8–11, male and female jaws M2 and F2 respectively are connected by a hinge H the same as those described above. Jaws M2 and F2 include gripping surfaces 18B for clamping against cable C when the jaws are energized by camming action produced by a cross-pin 40 secured in the end of an anchor link A2 and crossed slots 41, 42 of cam arms 43, 44 respectively, which are formed as integral extensions of jaws M2, F2 respectively. Cam arms 43, 44 may be in the form of yokes, one received within the other as indicated, the inner yoke in turn receiving the end of anchor part A2.

It will be understood from the description of the embodiments described hereinabove that the gripping surfaces, 18B for example, are, generally, of a longitudinal channel form. While various cross-sectional shapes may be employed for these surfaces, an oval cross-section, as is most clearly shown in FIG. 11, is particularly preferred. Gripping surfaces with such an oval cross-section are preferred since they allow lateral distortion of a cable engaged therebetween, thus minimizing the weakening damages effected upon the cable from the gripping action of the jaws.

OPERATION

In the device of FIGS. 1–4 and 1A, bore 16, an opening which is elongated circumferentially of socket 14, will be so aligned with trunnion bore 13 when the clamp is in the open position indicated in phantom in FIGS. 1 and 1A, that the bared end of cable C can be freely received through both bores and between gripping jaw surfaces 18. The workman, after effecting this initial stage of assembly, will release his hold (or the hold of such assembling apparatus as he may be using) in a manner such as to effect preliminary closing of jaw surfaces 18 against the cable as tension is allowed to gradually take effect, without, however, releasing the parts so suddenly as to risk pull-back of the cable from the clamp. Assuming that anchor part A is secured to an anchor body and that cable C is under tension (generated by its suspended weight or otherwise) the tendency of the cable to escape from the clamp when it is released will be overcome by the gripping effect of serrated jaw surfaces 18 and teeth 19 (if utilized—as when the cable is of woven-strand structure such as to be readily pierced by such teeth) which are several times as high as the serrations. As the full cable tension is imposed on the clamp, pulling against the fixed anchorage of part A, toggle means T will become effective to develop clamping pressure through the gripping surfaces 18 against the interposed cable end, such as to securely hold the cable when fully tensioned.

Operation of the modifications shown in FIGS. 5-11 is the same as that described above with the exception of the specific type of clamping pressure generating action of the tension-generating devices T1 and T2 of FIGS. 5–7 and 8–11.

Of course, various modifications of the preferred embodiments disclosed herein may be employed without departing from the spirit and scope of the invention nor without loss of its attendant advantages.

We claim:

1. In a cable clamp:
   a male jaw having at one end a transverse trunnion provided with a diametrical cable-receiving bore;
   a female jaw having at one end a transverse socket receiving said trunnion to provide a hinge connectiong said one ends for opening and closing movements of said jaws;
   said jaws having respective opposed cable-gripping surfaces spaced from said hinge toward the other end of said jaws;
   said socket having at one end an opening adapted to register with said trunnion bore in an open position of said jaws so that a cable may be passed through said opening and said bore and received between said gripping surfaces;
   an anchor part for attachment to an anchor body; and
   tension responsive means connecting said anchor part to the other ends of said jaws for developing gripping engagement of said gripping surfaces against said cable in response to increased cable tension.

2. A cable clamp as defined in claim 1, including means on said gripping surfaces for retaining said cable between said gripping surfaces pending development of said tension-energized gripping engagement.

3. A cable clamp as defined in claim 2, wherein said retaining means comprises opposed cable-piercing teeth projecting in opposed relation from said gripping surfaces.

4. A cable clamp as defined in claim 2, wherein said retaining means comprises serrations in said jaw surfaces, extending transversely of said jaws.

5. A cable clamp as defined in claim 1, wherein said tension responsive means comprises toggle links connecting said other ends of the jaws to said anchor part.

6. A cable clamp as defined in claim 5, said jaws having respective arms extending beyond said jaw surfaces to constitute said other ends of the jaws;
   said toggle links being in pairs, each consisting of two toggle links pivoted to the ends of respective arms, extending in converging relation to said anchor part and both pivoted to a respective side thereof.

7. A cable clamp as defined in claim 1:
   said other ends of the jaws comprising opposed arms extending beyond said gripping surfaces, having external ramp surfaces diverging toward their free ends, and pierced by longitudinal slots;
   a connector element extending through the slots of said arms and having ramp-following means at opposite ends thereof in sliding engagement with said ramp surfaces;
   said connector element being attached to said anchor part so as to effect jaw-closing wedge action by said ramp-following means against said ramp surfaces in response to cable tension.

8. A cable clamp as defined in claim 1:
   said other ends of the jaws comprising opposed bifurcated arms extending beyond said gripping surfaces, said arms having respective cam slots in diagonally crossed relation;
   and a cam-following element attached to said anchor part and extending transversely through said slots at the crossings thereof;
   the crossed relation and inclination of said slots being such that cable tension will be effective to urge said jaws toward one another, in response to cable tension.

9. A cable clamp as defined in claim 1, wherein said gripping surfaces are of longitudinal channel form and oval in cross-section so as to provide for lateral distortion of a cable engaged therebetween and subjected to gripping pressure tending to crush the cable, thereby minimizing weakening damage to the cable from the gripping action of said jaws.

* * * * *